United States Patent
Siaud et al.

(10) Patent No.: US 11,089,250 B2
(45) Date of Patent: Aug. 10, 2021

(54) PHOTOSENSITIVE SENSOR WITH ELEMENTARY SENSORS BUTTED TOGETHER

(71) Applicant: TRIXELL, Moirans (FR)

(72) Inventors: Martin Siaud, Moirans (FR); Bruno Bosset, Moirans (FR)

(73) Assignee: TRIXELL, Moirans (FR)

( * ) Notice: Subject to any disclaimer, the term of this patent is extended or adjusted under 35 U.S.C. 154(b) by 0 days.

(21) Appl. No.: 17/081,937

(22) Filed: Oct. 27, 2020

(65) Prior Publication Data

US 2021/0136304 A1    May 6, 2021

(30) Foreign Application Priority Data

Oct. 31, 2019    (FR) ........................................ 1912268

(51) Int. Cl.
*H04N 5/374*  (2011.01)
*H04N 5/341*  (2011.01)

(52) U.S. Cl.
CPC ............. *H04N 5/374* (2013.01); *H04N 5/341* (2013.01)

(58) Field of Classification Search
CPC ......... H04N 5/341; H04N 5/374; H04N 5/378
See application file for complete search history.

(56) References Cited

U.S. PATENT DOCUMENTS

| 5,914,485 A * | 6/1999 | Kobayashi | H04N 5/32 250/208.1 |
| 2003/0146994 A1* | 8/2003 | Kokubun | H01L 27/14603 348/308 |
| 2011/0147598 A1 | 6/2011 | Kobayashi et al. | |

FOREIGN PATENT DOCUMENTS

| EP | 2 378 258 A1 | 10/2011 |
| WO | 02/41621 A2 | 5/2002 |
| WO | 2008/142135 A1 | 11/2008 |

* cited by examiner

*Primary Examiner* — Kevin K Pyo
(74) *Attorney, Agent, or Firm* — BakerHostetler

(57) ABSTRACT

A photosensitive sensor includes multiple elementary sensors butted together, each elementary sensor comprising a pixel matrix organized in rows, the pixels of each row being connected to conductors of multiple types, column conductors of which are connected to read circuits of the sensor. The sensor moreover comprises, connected to each of the column conductors, a group of components that is separate from the conductor under consideration, the group of components forming a matching impedance of the conductor under consideration. The impedances in each elementary sensor have the same value and the impedances for different elementary sensors have different impedance values so as to balance the link impedances between the various read circuits and the corresponding column conductors for the various elementary sensors.

7 Claims, 4 Drawing Sheets

PHOTOSENSITIVE SENSOR WITH ELEMENTARY SENSORS BUTTED TOGETHER

CROSS-REFERENCE TO RELATED APPLICATIONS

This application claims priority to foreign French patent application No. FR 1912268, filed on Oct. 31, 2019, the disclosure of which is incorporated by reference in its entirety.

FIELD OF THE INVENTION

The present invention concerns a photosensitive device comprising a photosensitive pixel matrix of the type produced in particular by semiconductor material deposition techniques. The invention can be implemented for ionizing radiation and in particular x-ray imaging for detecting radiological images in the medical field or that of nondestructive testing in the industrial or safety fields.

BACKGROUND

Electronic photosensitive sensors are produced in the form of flat panels. They comprise a matrix of elementary electronic circuits, that is to say of blocks of components. The elementary electronic circuits are arranged in rows, and more precisely in rows and columns to form the matrix. The elementary electronic circuits are also referred to as pixels in image sensors. The pixels are for example formed from a photosensitive zone supplying a current of electric charges on the basis of the stream of photons that it receives and from an electronic circuit for processing this current. The photosensitive zone comprises a photodetector such as for example a photodiode, a photo resistor or a photo transistor. The pixel also comprises, in addition to the photosensitive element, an electronic circuit inside the pixel, the function of which is that of a charge collector, of control or of processing. This circuit is often produced from semiconductor components, such as diodes or transistors, allowing the provision of functions such as opening or closing of a circuit, resetting the photodetector, amplification, etc.

The photosensitive sensors moreover comprise conductors connecting the pixels. These conductors can run either in rows to connect the pixels row by row or in columns to connect the pixels column by column. The row and/or column conductors provide the necessary polarizations, the controls and the output channels for the information detected by each pixel. In practice, the term row or column is purely arbitrary. These terms may of course be swapped.

Photosensitive sensors are often produced by means of thin-film deposition techniques for semiconductor materials on a glass- or silicon-based substrate. In imaging that implements ionizing radiation and in particular x-rays, the difficulty in focusing this type of radiation leads to photosensitive sensors of large dimensions being produced. The dimensions of the sensors often exceed the conventional dimensions of the substrates. As an example, substrates of 200 or 300 mm in diameter are commonly found. By contrast, photosensitive sensors are generally rectangular and their largest dimension can exceed 400 mm. To produce these sensors having large dimensions, it is known practice to butt together multiple substrates. A method for producing such sensors butted together in which a scintillator allows the wavelength of the X-photons received by the sensor to be transposed to the wavelength to which photodetectors are sensitive is described for example in the patent application WO2008/142135 A1 filed in the name of the applicant. This patent describes the physical alignment of the various elementary sensors, each produced on its own substrate. This patent is not concerned with the electrical differences that can arise between the various elementary sensors. In another patent application: WO02/41621 A2, the applicant is concerned with the separate adjustment of the polarization of the pixels of the various elementary sensors. This adjustment allows limitation of the differences in output levels of neighbouring pixels when said pixels are saturated. This is because the output levels of the various pixels can differ from one elementary sensor to another. The patent application WO02/41621 A2 also describes the application of offset and gain corrections allowing adaptation of the response curve of the various pixels, in particular when they belong to different elementary sensors. These various adjustments work well at the level of the output of each of the pixels and when the pixel matrix is read at low speed. However, the length of the row conductors can disrupt the driving and reading of the pixel matrix. This is all the more punitive when the speed at which the matrix is driven and read increases. In-house tests have shown that the impedances of the conductors can differ greatly, especially when the conductors belong to separate elementary sensors butted together. It is possible to specify tight tolerances in the impedances of the conductors. These tight tolerances tend to increase the overall cost of producing the sensor.

SUMMARY OF THE INVENTION

The invention aims to free the tolerances on the values of the impedances of the conductors themselves by providing for the addition of specific components arranged in parallel or in series with each conductor so as to balance the overall impedances of neighbouring conductors as seen from outside the matrix.

It is therefore an object of the present invention to provide a photosensitive sensor comprising multiple elementary sensors butted together, each elementary sensor comprising a pixel matrix organized in rows, the pixels of each row being connected to conductors of multiple types, column conductors of which are connected to read circuits of the sensor. The photosensitive sensor moreover comprises, connected to each of the column conductors, a group of components that is separate from the conductor under consideration, the group of components forming a matching impedance of the conductor under consideration. The impedances in each elementary sensor have the same value and the impedances for different elementary sensors have different impedance values so as to balance the link impedances between the various read circuits and the corresponding column conductors for the various elementary sensors.

Moreover, the pixels in each row are connected to conductors of power supply conductor type that are connected to circuits for supplying power to the sensor. Advantageously, the photosensitive sensor comprises, connected to each of the power supply conductors, a group of components that is separate from the conductor under consideration, the group of components forming a matching impedance of the conductor under consideration. The impedances in each elementary sensor have the same value and the impedances in different elementary sensors have different impedance values so as to balance the link impedances between the various power supply circuits and the corresponding power supply conductors for the various elementary sensors.

Moreover, the pixels in each row are connected to conductors of control conductor type that are connected to circuits for controlling the sensor. Advantageously, the photosensitive sensor comprises, connected to each of the control conductors, a group of components that is separate from the conductor under consideration, the group of components forming a matching impedance of the conductor under consideration. The impedances in each elementary sensor have the same value and the impedances in different elementary sensors have different impedance values so as to balance the link impedances between the various control circuits and the corresponding control conductors for the various elementary sensors.

For two separate elementary sensors the conductors of at least one type can have different lengths and, in this case, the impedance values of the groups of components associated with the conductors of at least one type are matched on the basis of their respective length.

The groups of components advantageously comprise a resistor connected in series on the conductor under consideration and a capacitance connected between the conductor under consideration and an earth of the device.

Each group of components is advantageously arranged on a substrate of the corresponding elementary sensor between the pixel matrix and the circuit to which the associated conductor is connected.

The elementary sensors are advantageously each formed on an independent substrate.

BRIEF DESCRIPTION OF THE DRAWINGS

The invention will be better understood and further advantages will become apparent upon reading the detailed description of one embodiment provided by way of example, which description is illustrated by the attached drawing, in which.

For the sake of clarity, the same elements will bear the same references in the various figures.

DETAILED DESCRIPTION

The description that follows is provided with reference to a matrix-array detector formed from multiple elementary electronic circuits referred to as pixels, each comprising an element that is sensitive to a physical quantity. The elementary electronic circuits are, in the example described, pixels that are sensitive to light radiation. It is clear that the invention may be implemented for other detectors sensitive to any form of physical quantity, allowing for example pressure or temperature maps to be produced.

Figure 1:
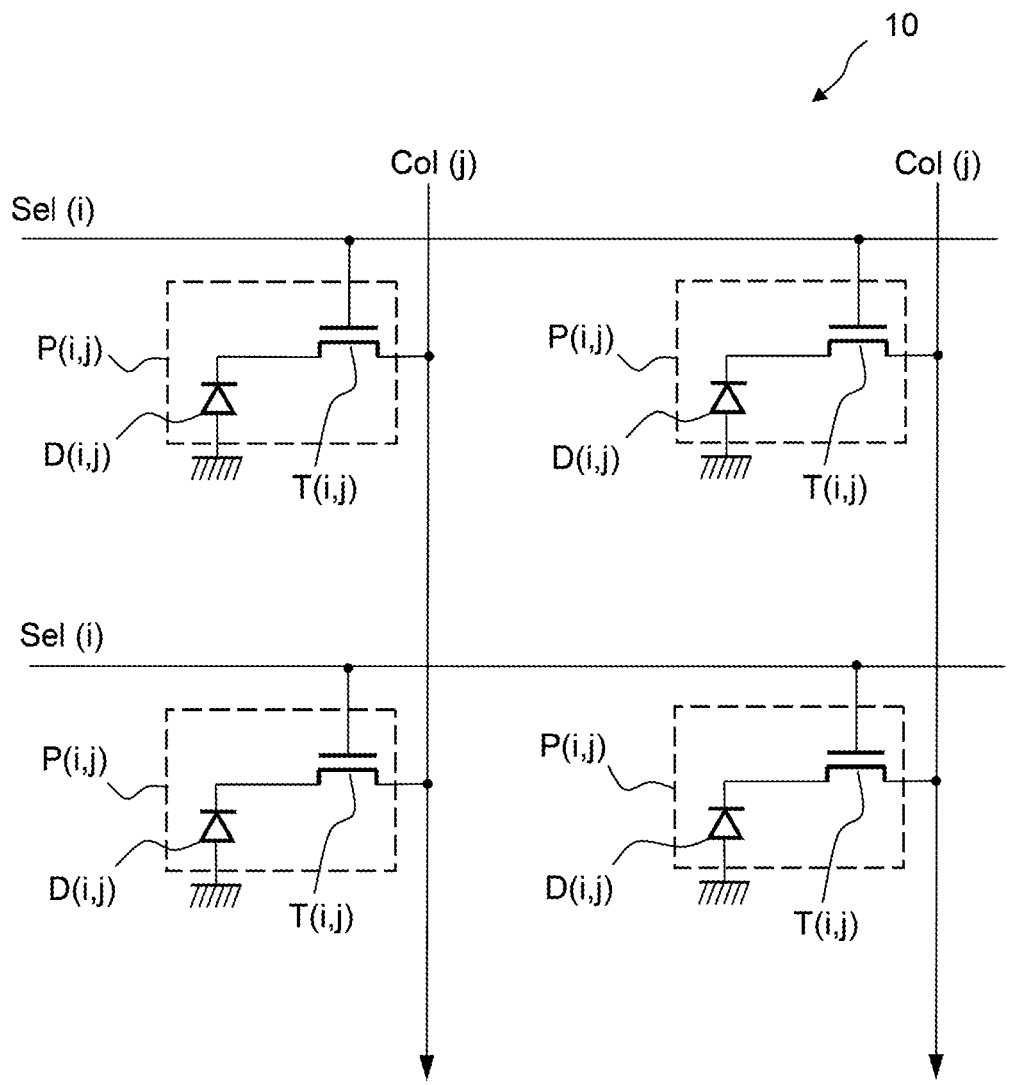
FIG. 1 schematically shows an exemplary pixel matrix 1T that may be implemented in a sensor according to the invention.

FIG. 1 schematically shows a matrix 10 of two rows and two columns to facilitate understanding. Four pixels P are formed, each at the intersection of one row and one column. Of course, actual matrix arrays are generally much larger and feature a large number of rows and columns. The matrix 10 belongs to a matrix-array detector allowing digitized images to be produced.

Each pixel P comprises a photosensitive zone, represented here by a photodiode D, and an electronic processing circuit formed, in the example of FIG. 1, by a single transistor T. The references for the components D and T are followed by two coordinates (i,j) that are able to take the rank of the row for i and the rank of the column for j. This pixel is also known as a 1T pixel since it possesses one transistor, the function of which will be described later on.

In a general manner, it is known practice to produce pixel matrices comprising transistors implementing complementary crystalline silicon semiconductors known by the abbreviation CMOS, where CMOS stands for "complementary metal oxide semiconductor". The invention is not limited to this type of transistor; for example it may be implemented for matrices comprising thin-film field-effect transistors known by the name TFT, where TFT stands for "thin-film transistor". TFTs may be based on metal oxides such as for example transistors based on amorphous or crystalline indium, gallium and zinc oxide, which are known by the abbreviation IGZO. Other families of TFT-type transistors may be implemented such as for example organic TFTs, amorphous silicon TFTs or polycrystalline silicon TFTs.

The pixels P of one and the same column are connected to a column conductor Col. This conductor allows information from the pixels connected thereto to be collected. The pixels P of one and the same row are connected to a row conductor Sel carrying a signal allowing each of the rows of pixels to be controlled.

During an image capture phase, the illumination received by each of the photodiodes D decreases the potential of its cathode, on which charges accumulate as a function of the illumination received. This image capture phase is followed by a read phase, during which the potential of the photodiode D is read. To do this, the transistor T is turned on, and therefore acts as a switch, by means of a row selection control carried by the conductor Sel and applied to the gate of said transistor. The various rows of pixels are read sequentially. The column conductors Col are used sequentially to collect information from pixels in the various columns when said information is selected. The read phase drains the charges of the photodiode D and allows it to be reset before a new image capture phase.

It is also possible to implement the invention in a detector in which the pixels are simpler, in particular by replacing the transistor T with a simple diode that is turned on by means of the row selection signal.

Figure 2:
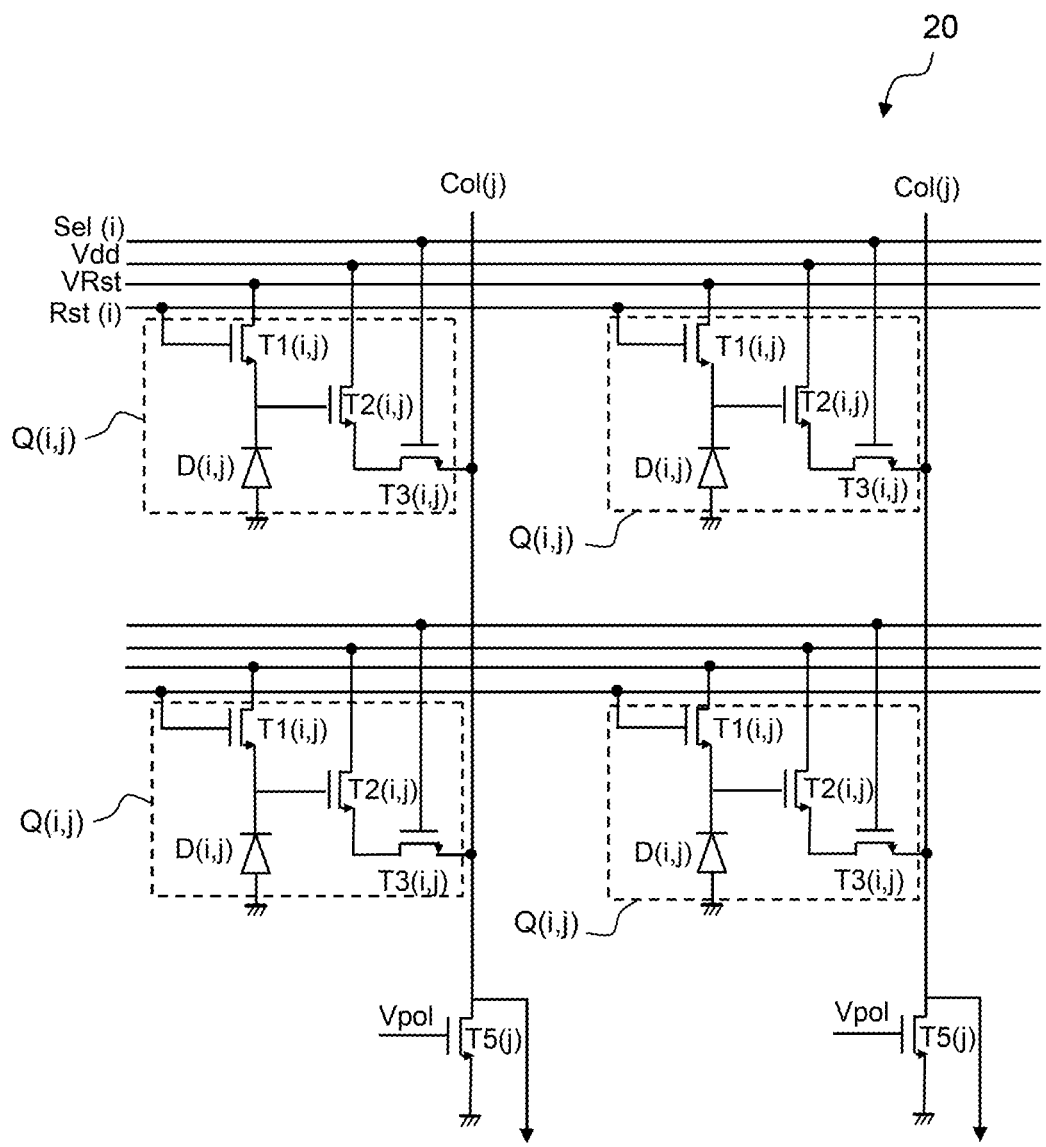
FIG. 2 schematically shows an exemplary pixel matrix 3T that may be implemented in a sensor according to the invention.

FIG. 2 schematically shows another example of a pixel matrix 20 referenced Q that is also able to be put in an image detector according to the invention. In each pixel Q there is the photodiode D, and an electronic processing circuit formed in this instance by three transistors T1, T2 and T3. As previously, the references of the photodiode D and the three transistors are followed by two coordinates (i,j) that are able to take the rank of the row for i and the rank of the column for j. In practice, this type of pixel can comprise other components, in particular other transistors. This is why this pixel is also known as a 3T pixel since it possesses at least three transistors.

The pixels Q in one and the same column share a transistor T5 situated at the end of the column conductor Col. The pixels Q in one and the same row are connected to four row conductors: Sel(i), Vdd, VRst and Rst(i) allowing each of the rows of pixels to be controlled.

The transistor T1 allows the voltage on the cathode of the photodiode D to be reset to a voltage carried by the conductor VRst. At first, this voltage remains fixed and does not vary during an image capture and read phase. The voltage VRst is applied to the cathode of the diode D during a reset operation, during which a control signal carried by the conductor Rst is active.

In an image capture phase, which takes place after a reset operation, as for the pixel P, the illumination received by the photodiode D of the pixel Q decreases the potential of its cathode. This image capture phase is followed by a read phase in which the potential of the photodiode D is read. To do this, the transistor T3 is turned on, and therefore acts as a switch, by means of a pixel selection control applied to the gate of said transistor and carried by the conductor Sel. The transistor T3 of the 3T pixel performs the same functional role as the transistor T of a 1T pixel described with reference to FIG. 1.

The transistor T2 acts as a follower and is supplied with power by a voltage carried by the conductor Vdd. The transistor T5 acts as a current source. The transistors T2 and T5 then form a voltage follower stage that copies the voltage present on the cathode of the photodiode D and reproduces it, to within an offset, on the column conductor Col when the transistor T3 is on. To produce its copy, the transistor T2 requires a polarization current flowing through its drain and its source. This current is imposed by a current generator formed by a transistor T5, which may or may not be common to multiple pixels. In the example shown, the transistor T5 is common to a column of pixels. It is also possible to use just a single transistor T5 as current source, for the whole matrix, provided that it is successively switched over to the various columns as these very columns are read. The column conductor Col is used both to polarize the transistor T2 and to collect information from a pixel in the corresponding column when said pixel is selected by means of the signal Sel. Alternatively, it is possible to split the column conductor Col in order to separate its two functions.

The invention can be implemented for pixels whose operation is different. As an example, the invention can be implemented for 4T pixels. In addition to the transistors T1, T2 and T3, 4T pixels comprise an additional transistor arranged between the cathode of the photodiode D and the gate of the transistor T2 forming the node of the pixel. This additional transistor allows the charges accumulated in the photodiode D to be transferred to the node of the pixel at a chosen instant.

One row conductor in the example of FIG. 1 and multiple row conductors in the example of FIG. 2 are connected to the various pixels P or Q in one and the same row. Control circuits, which are not shown in FIGS. 1 and 2, generally shift registers, generating the control signals carried by the conductor Sel(i) and the conductor Rst(i) when it is implemented, are connected to the corresponding row conductors. In the variant of FIG. 2, power supply circuits, which are also not shown and generate the voltages carried by the conductors Vdd and Vrst, are connected to the corresponding row conductors. The voltages of the signals carried by the conductors Vdd and Vrst are constant and may be identical, for which purpose a single type of row conductor can be used to carry the two signals and the supply of power to this type of conductor is provided by one and the same power supply circuit. This type of common conductor is then connected to the transistors T1 and T2 of each of the pixels Q. The conductors Vdd and Vrst are also referred to as power supply conductors on account of the constancy of the voltage that is applied to them. The control circuits and, if need be, the power supply circuits are arranged at the row end. Furthermore, the read circuits are arranged at the end of each of the column conductors Col.

The term row and column is purely arbitrary and could be switched. In practice, the control circuits and the power supply circuits can be arranged on one side of the matrix and the read circuits can be arranged on a side of the matrix perpendicular to the side on which the control circuits and the power supply circuits are situated. In order to simplify the connection of the various circuits, it is also possible to arrange all of the circuits, control, power supply and read, on the same side of the matrix.

The read circuits associated with the column conductors Col allow the signals collected on the column conductors to be digitized, for example. The various read circuits can comprise a multiplexer allowing the signals originating from a whole row of pixels to be assembled. Once a row has been read by the read circuits, it is possible to select a new row to repeat the read operation.

Figure 3:
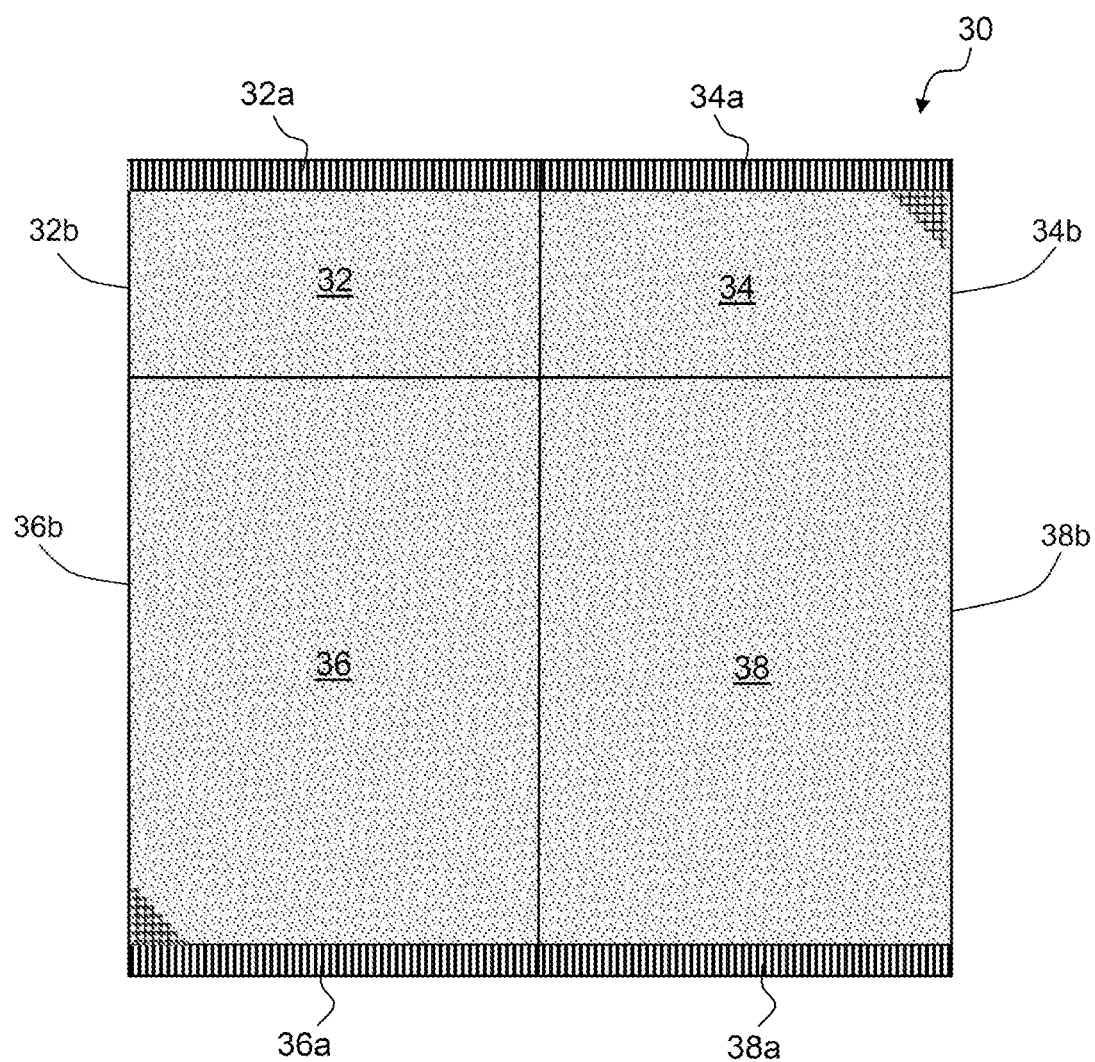
FIG. 3 schematically shows an exemplary sensor produced from multiple elementary sensors butted together.

FIG. 3 schematically shows an example of a sensor 30 comprising four elementary sensors 32, 34, 36 and 38, each formed on an independent substrate, 32b, 34b, 36b and 38b, respectively. The elementary sensors and therefore the respective substrates have the same shape. In the example shown, the elementary sensors 32, 34, 36 and 38 have a rectangular shape and are butted together along one side. The rectangular shape is well-suited to a pixel matrix in which the rows and columns extend perpendicularly with respect to one another. It is possible to implement the invention for other polygonal shapes of elementary sensors. The invention may be implemented regardless of the number of elementary sensors. Each of the elementary sensors 32, 34, 36 and 38 comprises a pixel matrix as described in FIG. 1 or FIG. 2. These four elementary sensors 32, 34, 36 and 38 are butted together to form the sensor 30. Each sensor comprises zones, 32a, 34a, 36a and 38a, respectively, in which the read circuits and the transistors T5 are arranged. The zones 32a, 34a, 36a and 38a do not contain any pixels. The zones 32a, 34a, 36a and 38a are situated at the level of the free end of the columns, that is to say the end not in contact with another elementary sensor. Where the elementary sensors are butted together, the pixels are as close as possible. To avoid any breaking of the image where the elementary sensors are butted together, the pixels of different elementary sensors are at the same interval apart as the step separating two neighbouring pixels of one and the same elementary sensor. The conductors of the various elementary sensors are not connected to one another where the elementary sensors are butted together. In other words, there is no conductor connecting one elementary sensor to another where the elementary sensors are butted together. In each of the elementary sensors 32, 34, 36 and 38, the row conductors run through the matrix between the pixels of the various rows. More precisely, the conductors Sel, Vdd, VRst and Rst run through their respective elementary sensor between the rows of pixels and the conductors Col run, still in their respective elementary sensor, between the columns of pixels. Each of the elementary sensors 32, 34, 36 and 38 comprises control circuits allowing generation of the signals carried by its own conductors Sel and Rst. Each of the elementary sensors 32, 34, 36 and 38 also comprises power supply circuits allowing generation of the signals carried by its own conductors Vdd and VRst. The control circuits and the power supply circuits can be arranged at the free end of the rows. Alternatively, they can be arranged in the zones 32a, 34a, 36a and 38a. The conductors Sel, Vdd, VRst and Rst are then arranged in columns just like the conductors Col. The same goes for the column conductors allowing the pixels to be read. Each elementary sensor comprises its own read circuits. The column conductors Col of the various elementary sensors are not connected to one another, even if they run on from one another. The orientation of the conductors will not be distinguished subsequently, the invention being able to be implemented whatever this orientation. On the other hand, the various types of conductors will be distinguished.

Figure 4:
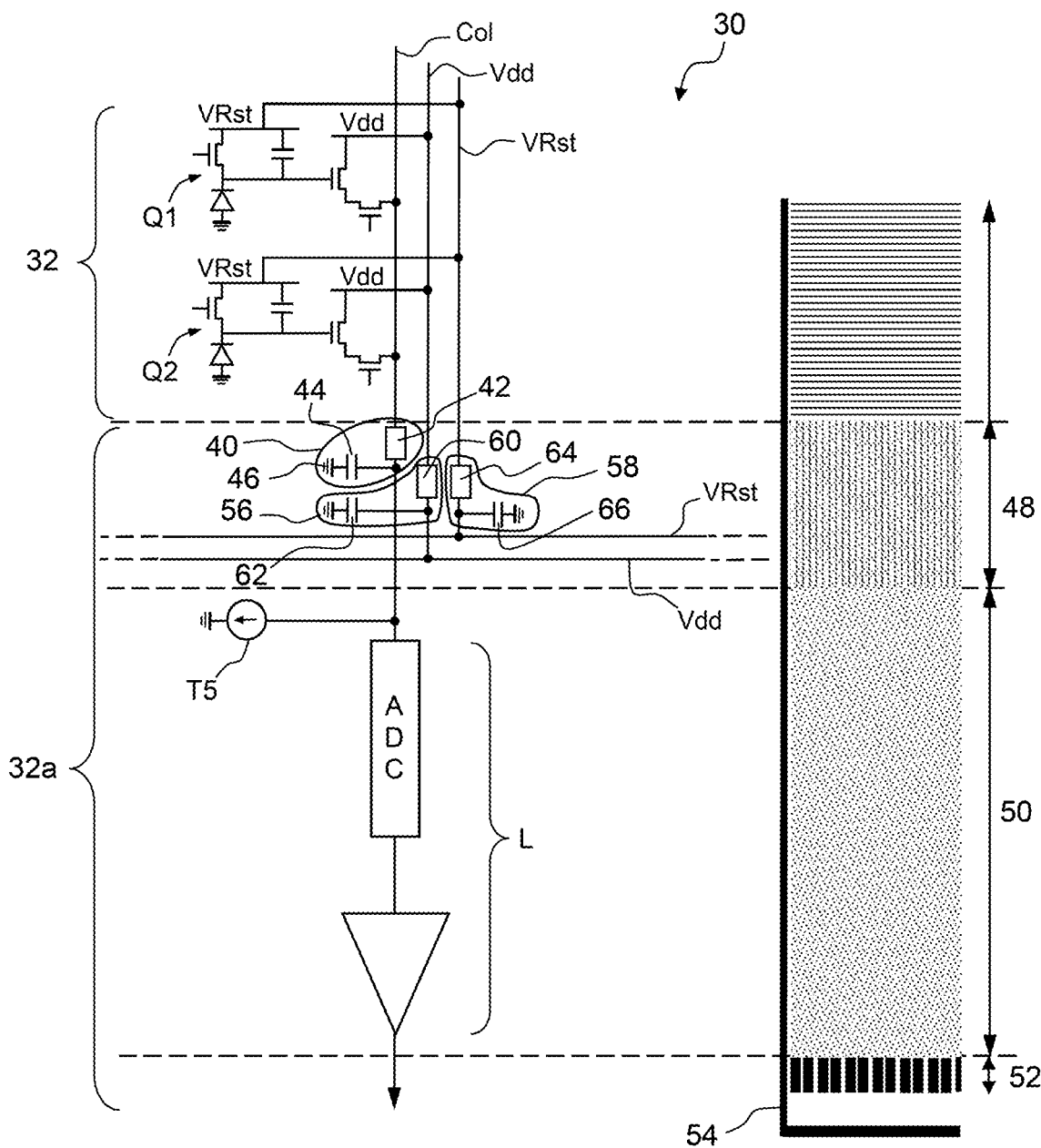
FIG. 4 shows a part of one of the elementary sensors in more detail.

FIG. 4 shows a part of one of the elementary sensors and more precisely the elementary sensor 32 and its zone 32a in more detail. This detail applies to all of the elementary sensors. Appearing in the part shown are two pixels Q1 and Q2 connected to the same column conductor Col. It is easy to transpose the diagram shown in FIG. 4 for a sensor implementing a 1T pixel P. In the zone 32a there is the current source represented by the transistor T5 and a read circuit L comprising for example an analogue-to-digital converter ADC allowing digitization of the voltage present on the conductor Col during the various read operations on the various rows of the pixel matrix Q.

Appearing in FIG. 4, connected to the column conductor Col, is a group of components 40 that is separate from the conductor Col and forms a matching impedance of the conductor Col. The sensor 30 comprises, for each of its column conductors Col, a group of components forming a matching impedance of the conductor under consideration.

Inside one and the same elementary sensor 32, 34, 36 or 38, the impedances connected to the various column conductors Col have the same value. The impedances from one elementary sensor to the next have different values so as to balance the link impedances between the various read circuits and the corresponding column conductors Col for the various elementary sensors.

In FIG. 4, the group of components 40 comprises a resistor 42 and a capacitor 44. The resistor 42 is connected in series between the read circuit L and the pixel Q2 that is closest to the read circuit L. The capacitor 44 is connected between one of the terminals of the resistor 42 and an earth 46 of the sensor 30. This RC circuit is provided by way of example. The group of components can comprise just a resistor without a capacitor. In other words, the group of components 40 can comprise just a single component. It is also possible to add an inductor to the group 40 depending on the need for impedance matching.

The choice of the type of components and their sizing allows compensation for the effects of the differences in the length of the conductors between the various elementary sensors 32, 34, 36 and 38. The resistor 42 allows compensation for the differences in the resistance of the conductors. The capacitor 44 and possibly the associated inductor allow compensation for the differences that can arise in the settling time of the signal during the read phase between the instant at which the transistor T3 of a pixel turns on and the instant at which the read circuit L receives this signal.

The components in the group 40 can be produced directly on the substrate of the elementary sensor with which they are associated in a first part 48 of the zone 32a. The same goes for the read circuit L, which can also be produced in a second part 50 of the zone 32a. Downstream of the read circuit L, the elementary sensor can comprise a third part 52 of the zone 32a allowing connection of the sensor 30 to its surroundings. Surrounding the part 52, the sensor 30 can comprise a sealing joint 54 ensuring that all of the components present on the substrates after they are butted together are leakproof. The sealing joint 54 is produced between an entry window, which is not shown, and the various substrates of the elementary sensors 32 to 38. The photosensitive elements can be directly sensitive to the radiation to which the sensor 30 is sensitive. In the field of X-rays, it is common to arrange a scintillator between the entry window and the elementary sensors 32 to 38. The scintillator receives the X-photons and retransmits photons having lower energy in a wavelength band to which the photosensitive elements are sensitive. The scintillator covers the zones in which the pixels are present. The parts 48 and 50 can be used as a positioning tolerance zone for the scintillator.

Independently of the group of components 40 that is associated with the column conductor Col, the sensor 30 can comprise another group of components, 56 and 58, respectively, that is associated with the power supply conductor Vdd and/or with the power supply conductor VRst. As for the group of components 40, the groups of components 56 and 58 are separate from the conductor with which they are associated, Vdd or VRst, and form a matching impedance of the respective power supply conductor. In the example shown in FIG. 4, the group of components 56 comprises a resistor 60 and a capacitor 62. The group of components 58 comprises a resistor 64 and a capacitor 66. The groups of components 56 and 58 are connected to their respective conductors Vdd and VRst in the same way as the group of components 40 is connected to the column conductor Col.

Regarding the power supply conductor VRst, when the pixels are reset by means of the control carried by the control conductor Rst, the photodiodes D of the various pixels will be discharged through the conductor VRst and therefore bring about a voltage drop on this conductor. The differences in the length of these conductors depending on the elementary sensor on which said conductor is situated bring about different voltage drops. Consequently, the discharges of the various photodiodes D will not be identical, bringing about offset differences between the various pixels. It is possible to correct these differences by adapting the value of the various resistors 64 on the basis of the elementary sensor on which the associated conductor VRst is situated. Moreover, resetting the pixels generates an inrush current on the conductor VRst, bringing about instantaneous voltage drops of varying duration depending on the length of the conductor VRst. Following this inrush current, the conductor returns to equilibrium. The duration of this return to equilibrium is also dependent on the length of the conductor VRst. It is possible to balance these durations by adapting the value of the capacitor 66 and possibly of an associated inductor.

Regarding the power supply conductor Vdd, supplying power to the transistors T2 of the various pixels, in order to copy the voltage present on the cathode of the photodiode D as faithfully as possible, it is necessary to balance the voltages present on this conductor as well as possible on the basis of the various elementary sensors. A voltage difference on the conductor Vdd can have the most significant effects close to where the various elementary sensors are butted together, which can bring about a visible difference in the image for neighbouring pixels belonging to different elementary sensors. The balancing of the voltages of the various conductors Vdd in order to limit the threshold effects where the elementary sensors are butted together is accomplished either by means of the resistors 60 for the mean value of the voltages or by means of the capacitors 62 and possibly the associated inductors for the settling times of these voltages.

It is also possible to anticipate the balancing of the impedances of the control conductors Sel and Rst. As described previously, the balancing of these impedances is accomplished by means of groups of components connected to the corresponding conductors and arranged between the pixel matrices and the associated control circuits. So as not to overload FIG. 4, these groups of components are not shown. They can also be arranged in the part 48 of each of the elementary sensors.

The various components of the groups 40, 56 and 50 can be produced by means of deposition of metal layers on the substrates of the elementary sensors in question. Other manufacturing methods make it possible to obtain in particular resistors such as the use of zones with the opposite doping to the doping of the substrate, for example. This method leads to the production of resistors known by the name «well resistor» in the English literature. The capacitors can be produced as a transistor whose drain and source are shorted.

The invention claimed is:

1. A photosensitive sensor comprising:
multiple elementary sensors butted together, each elementary sensor comprising a pixel matrix organized in rows, the pixels of each row being connected to conductors of multiple types, column conductors of which are connected to read circuits of the sensor,
connected to each of the column conductors, a group of components that is separate from the conductor under consideration, the group of components forming a matching impedance of the conductor under consideration, the impedances in each elementary sensor having the same value and the impedances for different elementary sensors have different impedance values so as to balance the link impedances between the various read circuits and the corresponding column conductors for the various elementary sensors.

2. The photosensitive sensor according to claim 1, wherein the pixels of each row are connected to conductors of power supply conductor type that are connected to circuits for supplying power to the sensor, the photosensitive sensor further comprising, connected to each of the power supply conductors, a group of components that is separate from the conductor under consideration, the group of components forming a matching impedance of the conductor under consideration, the impedances in each elementary sensor having the same value and the impedances in different elementary sensors having different impedance values so as to balance the link impedances between the various power supply circuits and the corresponding power supply conductors for the various elementary sensors.

3. The photosensitive sensor according to claim 1, wherein the pixels of each row are connected to conductors of control conductor type that are connected to circuits for controlling the sensor, the photosensitive sensor further comprising, connected to each of the control conductors, a group of components that is separate from the conductor under consideration, the group of components forming a matching impedance of the conductor under consideration, the impedances in each elementary sensor having the same value and the impedances in different elementary sensors having different impedance values so as to balance the link impedances between the various control circuits and the corresponding control conductors for the various elementary sensors.

4. The photosensitive sensor according to claim 1, wherein for two separate elementary sensors the conductors of at least one type have different lengths and wherein the impedance values of the groups of components associated with the conductors of at least one type are matched on the basis of their respective length.

5. The photosensitive sensor according to claim 1, wherein the groups of components comprises a resistor connected in series on the conductor under consideration, and a capacitance connected between the conductor under consideration and an earth of the device.

6. The photosensitive sensor according to claim 1, wherein each group of components is arranged on a substrate of the corresponding elementary sensor between the pixel matrix and the circuit to which the associated conductor, is connected.

7. The photosensitive sensor according to claim 1, wherein the elementary sensors are each formed on an independent substrate.

* * * * *